United States Patent Office

3,333,977
Patented Aug. 1, 1967

3,333,977
WATER-DISPERSIBLE COATING COMPOSITIONS AND PHENOLIC WOOD BASES COATED THEREWITH
Charles C. Clark, Kenmore, and Arthur J. Krawczyk, Cheektowaga, N.Y., assignors to Textron Inc., a corporation of Rhode Island
No Drawing. Filed Dec. 15 1961, Ser. No. 159,743
45 Claims. (Cl. 106—264)

This invention relates to compositions especially adapted for coating woods which are prone to stain, particularly redwood and cedar. More specifically, the coating compositions contain a drying oil component as an essential ingredient and are self-dispersible in aqueous media and in addition the compositions include anti-staining agents.

Redwood and cedar are well known to provide excellent lumber for building purposes since they are resistant to decay and vermin and thus are advantageous finishing materials. Often these woods are left unpainted; however, in many instances it is desirable to coat the woods to change their color or to provide further protection against the elements. When covering these woods with oil-base paints no unique problem arises; however, when employing a water-base coating composition the woods are prone to stain causing an unsightly surface finish which also exhibits great reluctance to dry. These stains are very difficult or even impossible to cover by a paint top coat.

The staining of redwood and cedar is caused by the occurrence in these woods of a variety of water-soluble materials which in general can be classed as phenols. Redwood contains polyphenolic ingredients including tannins as water-soluble coloring matter and other water-soluble components of the wood include cyclitols, polysaccharides and simple sugars. Various alcohol-soluble components such as polytannis, phlobaphenes and other coloring matter may also lead to staining problems. Cedar contains water-soluble materials which are polyphenols such as derviatives of polycatechol and thujaplicines and these materials can give surface stains. It should be noted that the staining phenomenon may occur only on certain pieces of lumber or even a part of a given piece of lumber and in any case the staining is often in the form of streaks or striations on the wood. The occurrence of staining is influenced by factors such as the part of the tree from which the lumber is derived as the staining components tend to concentrate in certain portions of the tree. Staining is also affected by the treatments, either natural or man-induced, to which the lumber has been subjected, since these factors may give rise to extraction, dissipiated or modification of the staining components of the wood. In any event, the user of the lumber is faced with the possibility and even the probability that some portions of the finish will strain and thus his initial or primer coating composition must be adapted to overcome this problem.

The advantages of using water-based paints are well known and include factors such as low odor, non-flammability, low toxicity and water clean-up of brush and tools used in painting. It has also been appreciated that many present water-based paints which do not contain drying oil components exhibit undesirable properties especially when used as exterior coatings where they are subjected to the action of water, strong ultraviolet light and other deteriorating factors. Thus to provide paints having the desired characteristics, the art has endeavored to supply vehicles which have the desirable properties of both oil- and water-soluble paints. These products contain a substantial amount of the drying oil component and generally are dispersible in water.

There have been efforts to market drying oil-containing vehicles which can be emulsified in water only through the use of an extraneous emulsifying agent, that is an ingredient which is not chemically reacted with the drying oil but which exhibits emulsifying properties to provide a dispersion of the oily vehicle in water. By and large, these water emulsions have not met with commercial success due to their disadvantageous properties. For instance, the emulsions exhibit poor stability and inadequate film-forming characteristics. The emulsions are difficult to pigment and are sensitive to zinc oxide which should be added as a fungicidal and mildewcidal agent. The emulsions have a low paint solids content for a given viscosity and if sufficient solids are included to provide good hiding power then the emulsion is too thick for good coverage and ease of application. Moreover, the emulsion coatings have exhibited poor ability to wet, penetrate and adhere to substrates such as chalky surfaces of weathered, previously painted woods.

All of these difficulties have led to the development of liquid paint vehicles which contain a drying oil component as an essential ingredient and yet avoid the shortcomings of the drying oil emulsion paints by having the property of being self-dispersible in water. Such compositions are the subject of the present invention.

Even though these self-dispersible drying oil vehicles can be formulated to provide paints exhibiting highly desirable properties in most respects, their direct application on bare redwood and cedar as aqueous dispersions still leads to surface staining as well as poor drying. In the present invention we overcome these problems by providing in the coating compositions at least two separate types of additive materials, one being an oxidizing agent or an acid and the other a heavy metal paint drier. The compositions, although especially adapted for coating woods containing phenols, can also be used to coat other surfaces including woods such as pine.

The first anti-staining additive can be an oxidizing agent or an acid and preferably we employ a combination of an oxidizing agent and an acid. The oxidizing agent is capable of supplying oxygen and may be organic or inorganic with the latter being preferred. The inorganic oxidizing agents are generally water-soluble, i.e. soluble to at least about 1 weight percent at ambent temperature or to the extent needed in our compositions, and relatively insoluble in drying oils. Suitable inorganic oxidizing agents include the metal salts whose anions have oxidizing capabilities. For instance, these salts include the various per or peroxy compounds such as the peroxides, perchlorates, persulfates, perborates, etc.; and the alkali metal, especially sodium, salts of these anions are most desirable. The permangantes and dichromates may be used with less advantage. Exemplary of the organic oxidizing agents, which are either drying oil soluble or water-soluble at least to the extent used in our compositions, are the organic peroxides which are in general relatively insoluble in water but soluble in drying oils. When the coating composition is to be white, the essentially colorless or white salts are advantageously employed.

The first anti-staining agent may also be an acid especially a relatively water-soluble lower monocarboxylic alkanoic or fatty acid of, for instance, 1 to 4 or more carbon atoms, especially acetic acid. The acids can, if desired, be substituted with non-deleterious substituents as in the case of chloroacetic acid. Also we can employ inorganic or mineral acids such as hydrochloric and sulfuric acid rather than the lower fatty acids. The mineral acids usually have dissociation constants in water of at least about $10^{-2}$ for the first hydrogen. The acids are water-soluble to at least the extent employed in our compositions.

The water-soluble anti-staining agent can be added to the drying oil vehicle itself, especially if the vehicle contains at least enough water to dissolve or solubilize the agent, or to a dispersion of the vehicle in large quantities of water up to the amount present in the vehicle when diluted to application viscosity. The agent may also be made as a concentrate in water and then the concentrate combined with either the drying oil component, the remaining water or their mixture. Should the additive be drying oil soluble, it can be added to the drying oil component at any time desired. In any event, the first anti-staining additive is used in a minor amount sufficient to give the coating composition anti-staining properties. Generally, the agent is at least about 1 weight percent of the drying oil vehicle and usually the amount will not be greater than about 20% since larger amounts seem uneconomic at this time. Advantageously, the amount of this anti-staining agent employed is about 2 to 12% of the vehicle. These amounts pertain either to the total amount of the first anti-staining agent employed or to each of such components when more than one is used. The latter basis is preferred and especially do the amounts apply to agents of different types, i.e. oxidizing agents and acids. Thus, we prefer the combination of about 2 to 12% of one or total acids and about 2 to 12% of one or total oxidizing agents.

Although the first anti-staining agents by themselves afford improvement in terms of anti-staining characteristics, it is most desirable to include in our compositions a drying oil soluble, relatively water-insoluble heavy metal carboxylic acid salt or soap. The salts are usually aliphatic, including cycloaliphatic. In this ingredient the heavy metal has an atomic number of about 20 to 82 and often the vehicle will include one or more of the manganese, lead or cobalt soaps. The organic carboxylic acid radical usually has about 5 to 40 carbon atoms and can be, for instance, the higher fatty acids of say 12 to 24 carbon atoms or a cyclo aliphatic carboxylic acid of even lesser number of carbon atoms. The acid radical can be substituted or unsubstituted, straight or branched chain, and is generally unsaturated, especially if not cyclo-aliphatic. Suitable acid salts include the oleates, naphthenates, linoleates, salts of polymerized acids such as ricinoleic acid dimer, etc. Preferred acids contain one carboxyl group. The oil-soluble heavy metal soaps are generally known as paint driers and will be used in minor amounts sufficient to give a substantial anti-staining and drying effect, for instance, about 0.5 to 15 weight percent, preferably about 2 to 8%, based on the drying oil vehicle.

There are a number of drying oil-based, water self-dispersible paint vehicles in which the anti-staining agents are effective. The vehicle in general contains a substantial amount of a drying oil component, usually at least about 50 weight percent, and preferably at least about 70% and up to about 90% of the vehicle. A drying oil ester can be employed in unmodified state but most often is modified with a poly functional material such as a polycarboxylic acid, polyolefin and/or a polyhydric alcohol. The modifying constituents may be up to about 75% of the drying oil component. Preferably this amount is up to about 30% and often about 10 to 30%. The drying oil can be the essential balance. In a number of these vehicles the drying oil component is reacted with an aliphatic polyether, including alkoxy polyethers, preferably a polyoxyethylene ether. The polyethers may be about 10 to 50% of the vehicle, advantageously about 10 to 30%. The polyethers are usually of about 200 to 6000 molecular weight and the repeating alkoxylene radical is of 2 to 3 carbon atoms.

A particularly suitable vehicle is described in U.S. patent application Ser. No. 81,694, filed Jan. 10, 1961, in the names of H. M. Schroeder and J. A. Pawlak, now U.S. Patent No. 3,100,157, hereby incorpoarted by reference. The products of that application are long oil compositions which provide paints that are air-driable to hard films exhibiting good resistance to water, ultraviolet light and other film degrading factors. Such paints also have the desired advantage of water-soluble paints enumerated before. The paints are readily pigmented and are stable to zinc oxide. The formulations are also characterized by a high percentage of total solids thus providing good coverage, hiding power and durability, and the products adhere firmly to chalky surfaces. Paints based on the long oil vehicle of the cited application are especially characterized by a high solids content at application viscosity affording good film thickness leading to a better over-all paint job.

The water-dispersible paint vehicle of application Ser. No. 81,694 is made through reaction of a long oil drying oil component and a polyoxyethylene polyol of 3 to 6 hydroxyl groups. The drying oil component contains at least about 80, preferably at least about 85 or even upwards of about 90, weight percent of a drying or unsaturated fatty acid in esterified form. The presence of at least about 80% of the ester provides a vehicle of excellent characteristics for use on exterior surfaces and insures maximum compatibility with zinc oxide. Thus the drying oil ester may be used as such or it may be reacted with up to about 10 or even up to about 15 or 20 weight percent of a modifying constituent prior to making the water-dispersible vehicle of this invention through reaction with the polyoxyethylene polyol. These percentages are based on the mixture of drying oil and modifying constituents. The modifying material contains a poly-functional group or configuration, that is it can combine, e.g. through olefin-bond polymerization or condensation, with two or more molecules of the drying oil ester or a modifying constituent.

The drying oil component and polyoxyethylene polyol are generally condensed in a proportion of about 75 to 90 weight percent of drying oil component to about 10 to 25 weight percent of the polyoxyethylene polyol based on their mixture. Preferably, the polyoxyethylene polyol reactant is about 12 to 20 weight percent based on its mixture with the drying oil component. The amount of polyoxyethylene polyol to be employed may vary with the nature of the desired product; in general, higher quantities of the polyether will impart more hydrophilic character and consequent water solubility. The precise choice of quantity of polyether employed may however vary with the characteristics of the oil or modified oil employed, such as viscosity. The choice will also vary with the desired solution viscosity as well as the drying time and other characteristics of the product.

Useful polyoxyethylene polyols have the formula

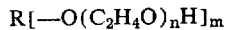

$$R[\!-\!O(C_2H_4O)_nH]_m$$

where R is an $m$-valent aliphatic hydrocarbon radical of 3 to 6 carbon atoms derived from a polyhydric alcohol of 3 to 6 hydroxyl groups, $n$ is an average of 4 to 12 and $m$ is 3 to 6. These materials generally have an average molecular weight of about 500 to 2000 and advantageously the molecular weight is in the range of about 600 to 1200. The preferred polyols have 3 to 4 hydroxyl groups especially 3 such as in the case of the polyoxyethylene glycerols which are liquid, water-soluble materials that are easy to handle and give reaction products affording quick drying films. Suitable polyoxyether polyols include among others the polyoxyethylene derivatives of glycerol, trimethylol propane, hexanetriols, pentaerythritol, sorbitol, etc. It will be understood that blends of higher and lower molecular weight polyoxyether polyols to yield mixtures within the approximate foregoing molecular weight ranges are also contemplated.

Although the vehicle is self-dispersible in water, in some instances it may be preferred to include a coupling solvent in the composition in order to increase the solution range of the reaction product in water, for instance it is most advantageous to obtain a solution in water at a dilution which gives a composition having a viscosity in the approxmate 1 to 3 poise range desired for surface application. Thus after the reaction product is formed it can be mixed with up to about 30 weight percent of the coupling agent, for instance about 5 or 10 to 25 weight percent, preferably about 15 to 20 weight percent, of an oil and water-soluble coupling agent. The agents are often oxygenated organic compounds such as ethers, alcohols, or esters. Preferred coupling agents are ethylene glycol ethers having the formula $$RO(CH_2CH_2O)_xR_1$$

wherein R is a monovalent hydrocarbon radical having up to about 8 carbon atoms, preferably not more than about 5 carbon atoms, $x$ is 1 to 2 and $R_1$ is hydrogen or

Advantageously, R is a lower alkyl radical having, for instance, 1 to 4 or more carbon atoms. Included within the oil and water-soluble coupling agents are ethylene chlorohydrin, butanol, ethylene glycol monobutyl ether, ethylene glycol monoethyl ether, ethylene glycol monomethyl ether, ethylene glycol monophenyl ether, ethylene glycol monoisoamyl ether, methyl butynol (2-methyl-3-butyn-2-ol), the acetate of these ethers and the corresponding diethylene glycol ethers and acetates, etc. In addition to the preferred coupling agents noted above, coupling agents giving vehicles, intermediate between a typical white milky emulsion and a translucent colloid, in a viscosity range at 40 NV of 0.5 to 3.5 poises, and which are stable include 15 and 25% diacetone alcohol, 15 and 25% dimethyl formamide, 15 and 25% dimethyl acetamide, 15 and 25% acetonitrile, 15 and 25% tetrahydrofuran and 15 and 25% Shell's Pent-oxol (4-methyoxy-4-methyl-2-pentanol). Generally, the coupling agents boil in the range of about 100 to 200° C. This constituent, as is the case with the others described, usually does not contain additional substituent groups although such may be present if the overall effect desired is not materially reduced.

In preparing these water-dispersible vehicles the drying oil component and polyoxyethylene polyol can be reacted at an elevated temperature, for instance of about 150 to 250° C. in the presence or absence of a catalyst. The reaction time is that which gives a liquid, water-self dispersible product and preferably it is most advantageous to stop the reaction when the heating of selected samples shows that the viscosity of the product in water approximates a minimum. The reaction product usually has a viscosity of up to about 100 poises or somewhat greater; often the viscosity does not exceed about 40 poises and most advantageously is less than about 10 poises, for instance about 5 to 10 poises. Usually the reaction time is about 1 to 12 or more hours; however, we prefer times of about 2 to 6 hours.

The long oil drying oil component of the water-dispersible liquid reaction product of application Ser. No. 81,694 is an unsaturated aliphatic monocarboxylic acid ester, e.g. glyceride, whether natural or synthetic. The drying oil ester is of a fatty or alkenyl carboxylic acid having about 14 to 20, preferably about 18, carbon atoms, and 1 to 3 or more, usually at least 2, unsaturated carbon-to-carbon or olefinic bonds. The alcohol portion of the ester is of an alkane polyhydric alcohol of 3 to 6 hydroxyl groups and 3 to 6 carbon atoms. The preferred alkanol source of the ester radical is glycerol which affords glycerides such as those occurring in nature. The drying oil component initially can be in acid form and be subsequently reacted with the polyhydric alcohol to form the ester. Alternatively, the acid can be reacted with the polyhydric alcohol at the same time the drying oil component is being modified, for instance with a polyhydric alcohol and with or without another modifying constituent such as a polycarboxylic acid. In any event the drying oil component is essentially in the ester form when reacted with the polyoxyethylene polyol. Heat bodied or polymerized forms of the drying oil acids and esters are also useful. Thus the drying oil component may be the drying oil ester as such or the carboxylic acid or ester can be modified through pre-reaction with up to about 20 weight percent, preferably about 5 to 15 weight percent, of one or more polyfunctional compounds such as polyolefins, polycarboxylic acids and polyhydric alcohols. These acids and alcohols can also have olefinic unsaturation. The modification preferably involves a polyolefin or both a dicarboxylic acid and polyhydric alcohol. For instance, the modifying polycarboxylic acid and polyhydric alcohol will usually be employed in approximately esterification stoichiometric proportions although either may be in excess. We prefer an excess of alcohol. Generally about 25 to 75 weight percent of each of the polycarboxylic acid and polyhydric alcohol based on their mixture is used in modifying the drying oil ester with such materials. The various drying oil components can be further substituted with non-interfering substituents although they are most often employed in unsubstituted form. Regardless of its constituency the drying oil component, whether an ester itself or a modified ester, is essentially liquid at ambient temperatures and in general has a viscosity in the ranges set forth above with respect to the polyoxyethylene polyol reaction product.

The drying, including semi-drying, oils which can be used in the preparation of the water-dispersible vehicles include the synthetic polyhydric alcohol esters of non-conjugated and conjugated unsaturated fatty acids as well as non-conjugated and conjugated natural drying oils of animal and vegetable origin, all having an iodine value not less than about 110. For example, soybean oil, linseed oil, safflower oil, tung oil, perilla oil, China-wood oil, oiticica oil, walnut oils, poppyseed oil, etc., are among the natural drying and semi-drying oils which may be used while the unsaturated acids include olec, ricinoleic, linoleic, linolenic, etc. Where tung oil or other natural conjugated oils are employed, it is preferred to first heat the oils to an elevated temperature of 280° C. or thereabouts to "gas-proof" or enable them to form non-wrinkling films, just as would be the case in their use in conventional organic solvent system paints or varnishes. Thus, the conjugated oils may be considered a special case of the modified oils which are operable. Similarly, glycerol and other higher polyhydric alcohol esters of the mixed fatty acids which characterize the natural drying and semi-drying oils may be employed. Included would also be the polyhydric alcohol esters of tall oil and of tall oil fatty acids.

When modified drying oils are used, the pre-reaction of the drying oil acid or ester component can be with a polycarboxylic acid, polyhydric alcohol or their mixture. These materials encompass aliphatic, including cycloaliphatic, and aromatic dicarboxylic acids of, for instance, 2 to 12, preferably 4 to 8, carbon atoms. Representative acids are: the alpha, beta ethylenically unsaturated polycarboxylic acids, maleic, fumaric, aconitic, etc.; the saturated aliphatic polycarboxylic acids, succinic, glutaric, sebacic, azelaic, tartaric, etc.; and the aromatic polycarboxylic acids such as the phthalic acids. Also the acid anhydrides, esters, partial esters and other forms can be employed.

The polyhydric alcohols employed in the modified drying oils are aliphatic, including cycloaliphatic, in character, and are the same as those forming the ester portion of the drying oil component. The materials are alkane polyhydric alcohols generally of 3 to 6 carbon atoms and containing 3 to 6 hydroxyl groups to a molecule. Among the useful polyhydric alcohols are glycerol, mannitol, sorbitol, pentaerythritol, trimethylol propane, trimethylol ethane, 1,3,6-hexanetriol, etc. and these can be mixed with other materials, for instance ethylene glycol, diethylene glycol, dipentaerythritol, etc.

The drying oil component may be modified through reaction with a polyolefinic or even a mono-olefinic material. The olefins can be aliphatic, including cycloaliphatic, that is alkenyl, hydrocarbons. The olefins can also be substituted as with an aromatic, e.g. phenyl, radical. Usually the olefinic material has about 4 to 10 carbon atoms, and among the useful materials are cyclopentadiene, cyclohexadiene, 1,4-butadiene, isoprene, styrene, vinyl toluene, etc.; however, polymers of these olefins containing 2 to 10 units of monomer may also be employed.

Although we strongly prefer the maleic acid (including anhydride)-pentaerythritol modified oils, another class which may be employed is defined as the long oil modified phthalic anhydride, or isophthalic acid modified oils in which the oil content is about 80% or greater, and which oils are capable of being made at 100% non-volatile at viscosities of not significantly greater than about 100 poises. Specifically, such modified long oils can be made as liquid materials without the use of naphtha or other petroleum or organic solvents. This fact is of great consequence in obtaining the unique liquid products which are capable of thinning with water to obtain dispersions and solutions having very useful properties as paint vehicles and for the other purposes.

The long drying oil component can be modified by the described or other constituents under the usual conditions, e.g. temperatures of about 200 to 300° C. and pressures at or above atmospheric. Generally the reaction is continued to insure a liquid product, for instance, prolonged heating may cause undesirable gelation, and most often the acid number of the liquid product is below about 20.

Although the drying oil component-polyoxyethylene polyol liquid condensate can be dispersed in organic vehicles such as the usual paint thinners, the reaction product is water-dispersible and can be used most advantageously in aqueous based coating compositions containing other ingredients if desired such as solid pigments, fungicides, mildewcides, etc., which can be added to the reaction product, for instance in amounts up to about 100 weight percent, most often greater than about 10 weight percent based on the reaction product. The aqueous based coating composition can have varying amounts of water with the amount usually being selected by the coating applicator according to the characteristics desired in the composition both during application and after drying. In many instances, the water will be sufficient to give a product of about 1 to 3 poises viscosity for application to surfaces. The coating composition can also contain solid pigments and other ingredients. The various agents such as the pigment and fungicide are preferably added to the drying oil component-polyoxyethylene polyol reaction product prior to dilution for application as a coating.

Other water self-dispersible, drying oil-based vehicles are described in U.S. patent applications Ser. No. 81,700, filed Jan. 10, 1961, to Schroeder and Pawlak, now U.S. Patent No. 3,297,605, and Ser. No. 130,542, filed Aug. 10, 1961, to Schroeder and Walker, all having a common assignee, both of which are hereby incorporated by reference. In the first of these applications the water-dispersible vehicle is a condensate of about 75 to 90% of the drying oil ester of application Ser. No. 81,694 and about 10 to 25% of a polyethylene glycol having a molecular weight of about 400 to 2000. The final product of application Ser. No. 81,700 exhibits in general the viscosity characteristics of the vehicle of application Ser. No. 81,694 and can be prepared from the same long oil drying oil ester, modified or unmodified, and under the same conditions of reaction as set forth in the latter application. Again, the products of Ser. No. 81,700 although self-dispersible in water can be employed with a coupling agent as disclosed with respect to the vehicle of application Ser. No. 81,694. In the best products of the types shown in applications Ser. Nos. 81,694 and 81,700 the polyether is generally combined with the drying oil ester, modified or unmodified, in the essential absence of other unreacted drying oil modifying agents.

In application Ser. No. 130,542 the liquid, water self-dispersible vehicle is a condensate of about 70 to 90% of the drying oil ester as set forth in the other cited applications and containing at least about 25% of a drying or unsaturated fatty acid ester, preferably at least about 80% of the ester to give a long oil product, and about 10 to 30% of a polyoxyalkylene glycol of the formula $RO[(CH_2)_xO]_yH$, wherein $x$ is 2 to 3, $y$ is an integer giving a molecular weight of about 200 to 2500 and R is an alkyl radical of up to about 20 carbon atoms, preferably up to about 4 carbon atoms. In general, these products are made under the conditions and have the viscosity characteristics as set forth in the other cited applications. The alkoxy polyether can be reacted with the drying oil component while the latter is being esterified or modified, but preferably the polyether is reacted subsequent to these operations and in the essential absence of other drying oil esterifying or modifying agents. Especially suitable polyethers are the methoxy polyethylene glycols. Again, a coupling agent can be used with the products of application Ser. No. 130,542; however, their presence is less significant due to the use of the alkyl terminated polyethylene glycol.

Other water self-dispersible drying oil vehicles have been disclosed in the art, for instance see Arndt Patent 2,634,245 and Armitage and Trace Patent 3,001,961, hereby incorporated by reference. The products of these patents are characterized as drying oil modified alkyd resins. For instance, Arndt reacts 70 to 90% by weight of an oil modified alkyd resin, 30 to 60% drying oil, with 10 to 30% by weight of polyethylene glycol, whereas Armitage and Trace disclose a so-called built-in polyoxyethylene modified product where polyoxyethylene glycol is present in the reaction mixture including the drying oil and alkyd resin components during oil modification. The amount of polyethylene glycol is 10 to 20% whereas the resin oil length may range from 35 to 80%. Polyethylene glycols of about 1000 to 6000 are preferred by Armitage and Trace, whereas Arndt mentions polyethylene glycols of above 300 to 2000 molecular weight. The vehicles of both of these patents suffer serious shortcomings as set forth in the above-cited applications, including for instance the difficulty of getting a product of good stability and film-forming characteristics, poor application to surfaces, etc. Thus these vehicles are representative of the type which can be employed in the present invention but with considerable overall disadvantage. If desired, of course, one may use an extraneous emulsifying agent even in the case of a water self-dispersible vehicle.

The following examples will serve to illustrate the present invention and are not to be considered limiting.

EXAMPLE I

A water self-dispersible paint vehicle is prepared by alcoholizing an alkali refined linseed oil with 3.9% pentaerythritol by weight for 1 to 2 hours at about 250° C. and subsequent reaction at about 250° C. with 4.9% maleic anhydride in the presence of a PbO catalyst to yield a maleic modified oil having a viscosity of 7 poises.

331 parts of this modified oil, 69 parts of polyoxyethylene glycerol 1000 (molecular weight, 1000; hydroxyl value, 170 and freezing point —5° C.) and 0.1 part of PbO are heated together for 4 hours at 205° C.; the resinous product has a viscosity of 8 poises and a Gardner color of 8.

This vehicle is reduced to 85% non-volatile (NV) by the addition of 15% ethylene glycol monobutyl ether and employed in preparing a primer paint of the following composition:

*Primer 475–20–1*

| Component: | Parts by weight |
| --- | --- |
| Water-dispersible vehicle | 355 |
| Lead naphthenate (24%) | 8 |
| Manganese naphthenate (6%) | 1.25 |
| Cobalt naphthenate (6%) | 2.7 |
| Lecithin | 7.5 |
| Magnesium silicate | 300 |
| Lead silicate | 425 |
| Rutile | 150 |
| Water | 375 |

The viscosity of this formulation was 85 Krebs units.

Various anti-staining agents listed in Table I below were added in admixture with a small amount of the total water (e.g. about 5%), to the above paint formula. The resulting paints were coated on bare redwood and cedar panels and the films allowed to dry at room temperature. In some of the examples, acetic acid was added in the form of glacial acetic acid. In all cases, staining of the surface coating was inhibited due to the presence of the anti-staining agents and in general the improved composition exhibited significantly reduced drying time. The paint compositions were not significantly affected by the addition of anti-staining agents, with respect to viscosity, flexibility, increase in drying time, skinning and settling when stored in plastic-lined cans. The performance of the compositions was noted according to the ratings excellent, good, fair and poor which indicate, respectively, no stain, slight staining tendency, moderate staining tendency and definite and extensive stain.

TABLE I

| Test No. | Anti-staining agent [1] | Conditions of coating with respect to staining | |
|---|---|---|---|
| | | Redwood | Cedar |
| 1 | 0% control | Poor | Poor |
| 2 | 1% sodium persulfate | Good | |
| 3 | 1% sodium persulfate, 1% acetic acid | ...do | |
| 4 | 1% sodium perborate | ...do | |
| 5 | 1% sodium perborate, 1% acetic acid | ...do | |
| 6 | 1% hydrochloric acid (37%) | Fair | |
| 7 | 1% sodium persulfate, 1% hydrochloric acid (37%) | Good | |
| 8 | 1% sodium persulfate, 1% sulfuric acid (93%) | ...do | |
| 9 | 0.6% hydrochloric acid (37%), 1% sodium perborate | ...do | |
| 10 | 1% sodium perborate, 0.8% sulfuric acid (93%) | ...do | |
| 11 | 1% sodium perchlorate, 1% acetic acid | ...do | |
| 12 | 1% sodium persulfate, 1% formic acid | ...do | Good |
| 13 | 1% cumene hydroperoxide | ...do | |
| 14 | 1% benzoyl peroxide, 1% acetic acid | Excellent | |
| 15 | 1% acetyl peroxide | Poor | Do. |
| 16 | 1% ditertiary butyl peroxide | Fair | |
| 17 | 1% methyl ethyl ketone peroxide in dimethyl phthalate (60%) | Excellent | Do. |
| 18 | 1% methyl ethyl ketone peroxide in dimethylphthalate (60%), 1% acetic acid | Good | Excellent. |
| 19 | 1% cumene hydroperoxide, 1% acetic acid | ...do | Do. |
| 20 | 1% cumene hydroperoxide | Poor | Good. |
| 21 | 1% ditertiarybutyl peroxide, 1% acetic acid | Good | Excellent. |
| 22 | 1% acetyl peroxide, 1% acetic acid | ...do | Do. |
| 23 | 0.1% acetic acid | Poor | |
| 24 | 1% acetic acid | Excellent | Do. |
| 25 | 2% acetic acid | Good | |
| 26 | 2% acetic acid, 2% sodium persulfate | Excellent | |
| 27 | 2% acetic acid, 5% sodium persulfate | Good | |
| 28 | 5% sodium persulfate | ...do | |
| 29 | 1% potassium permanganate, 1% acetic acid | Fair | |
| 30 | 1% potassium dichromate, 1% acetic acid | ...do | |
| 31 | 1% formic acid | Poor | Good. |
| 32 | 1% propionic acid | Good | Excellent. |
| 33 | 1% butyric acid | ...do | Good. |
| 34 | 1% chloroacetic acid | Excellent | Do. |
| 35 | 1% lactic acid | Poor | Poor. |
| 36 | 1% citric acid | ...do | Do. |
| 37 | 1% itaconic acid | ...do | Do. |
| 38 | 1% succinic acid | ...do | Do. |
| 39 | 1% tartaric acid | ...do | Do. |
| 40 | 1% maleic acid | ...do | Do. |

[1] Percent based on whole paint in this and other tables.

The above data show that with some agents the amount needed to avoid staining may vary. Tests 36 to 40 show the unsuitability of water-soluble polycarboxylic acids, while test 35 indicates that some substituents may make the acid ineffective. Also the problem of staining may be very severe with woods from certain parts of the tree and you may not always be able to avoid staining even when using the anti-staining agents. It is preferred to have compositions of acid pH, for instance in tests 3, 5, 7 and 8, the pH varied from 5.8 to 6.1.

A white exterior house paint containing zinc oxide, titanium dioxide and magnesium silicate and 1% of sodium persulfate or 1% acetic acid and 1% sodium perborate produced good coatings on redwood with respect to anti-staining.

When Tests 2, 3, 4 and 5 of Table I are repeated in the primer without the naphthenate driers, the results with respect to anti-staining on redwood were fair, fair, poor and excellent, respectively.

EXAMPLE II

A modified oil is prepared by reacting linseed oil at 250° C. for 1–2 hours with 3.9% pentaerythritol and subsequently at 250° C. with 4.9% maleic anhydride to yield a product having a viscosity of 7 poises. 1655 g. of the modified oil is reacted for 2 hours at 220° C. with 345 grams of PEG 600 in the presence of 1.0 g. of PbO. The cooled reaction product is reduced with 25% ethylene glycol monobutyl ether yielding a clear vehicle of 0.9 poise viscosity.

Our anti-staining agents are added to a primer composed as follows:

Component: Parts by weight
Water-dispersible vehicle of Example II _____ 320
Water _____ 204
Mineral spirits _____ 203
Rutile titanium dioxide _____ 150
Basic silicate white lead _____ 250
Magnesium silicate _____ 350
Aluminum stearate _____ 2
Lead naphthenate (24%) _____ 7.5
Manganese naphthenate (6%) _____ 2

The results as to staining are shown in Table II with respect to coating bare redwood and cedar.

TABLE II

| Test No. | Anti-staining additive | Conditions of coating with respect to staining | |
|---|---|---|---|
| | | Redwood | Cedar |
| 1 | 0% control | Poor | Poor. |
| 2 | 1% sodium persulfate | Good | Fair. |
| 3 | 1% sodium persulfate, 1% acetic acid | Excellent | Good. |

EXAMPLE III

A water self-dispersible paint vehicle is prepared by reacting 2425 g. of a linseed oil modified as in Example II, with 503 g. of polyethylene glycol 1000 at 200° C. for four hours and in the presence of 2 g. of PbO.

Our anti-staining agents are added to the primer of Example II, but substituting the paint vehicle of this example for that of Example II. The results as to staining are shown in Table III with respect to coating bare redwood and cedar.

TABLE III

| Test No. | Anti-staining additive | Conditions of coating with respect to staining | |
|---|---|---|---|
| | | Redwood | Cedar |
| 1 | 0% control | Poor | Poor. |
| 2 | 1% sodium persulfate, 1% acetic acid | Good | Good. |

EXAMPLE IV

A water self-dispersible paint vehicle is prepared by modifying an alkali refined linseed oil by alcoholysis at 250° C. with 3.9% pentaerythritol and subsequent reaction at 250° C. with 4.9% maleic anhydride to give a modified linseed oil having a viscosity of 7 stokes. 1,186 parts of this oil, 213 parts of methoxy polyethylene glycol 350 (molecular weight 350, freezing point −5° C.)

and 0.3 g. of PbO were heated together for 2 hours at 220° C. The clear resultant product has a viscosity of 3.5 stokes, an acid value of 6.7, Gardner color of 6.5 and Sp. Gr. of 0.9858 (15.5/15.5° C.).

Our anti-staining agents are added to the primer of Example II but substituting the paint vehicle of this example for that of Example II. The results as to staining are shown in Table IV with respect to coating bare redwood and cedar.

TABLE IV

| Test No. | Anti-staining additive | Conditions of coating with respect to staining | |
|---|---|---|---|
| | | Redwood | Cedar |
| 1 | 0% control | Poor | Poor. |
| 2 | 1% sodium persulfate | | Excellent. |
| 3 | 1% sodium persulfate, 1% acetic acid | Excellent | Do. |

It is claimed:
1. A liquid, water self-dispersible composition of matter consisting essentially of a condensate of about 50–90% of a drying oil ester of an unsaturated fatty acid of 14–20 carbon atoms and a polyhydric alkanol of 3–6 carbon atoms and having 3–6 hydroxyl groups, and about 10–50% of an alkylene polyether of about 200–6000 molecular weight, and being of an alkylene group of 2–3 carbon atoms; a drying oil-soluble heavy metal paint drier carboxylic acid salt of a heavy metal having an atomic number of 20 to 82, and a carboxylic acid of 5 to 40 carbon atoms; and a material selected from the group consisting of inorganic, water-soluble metal salt oxidizing agents, organic peroxides, water-soluble inorganic mineral acids having a dissociation constant of at least about $10^{-2}$ and water-soluble lower monocarboxylic alkanoic acids, said material and said drier being present in amounts sufficient to retard surface staining of phenolic-containing wood when coated by an aqueous dispersion of said composition.

2. The composition of claim 1 containing at least a sufficient amount of water to dissolve said material.

3. The composition of claim 2 wherein the drying oil-soluble heavy metal salt is present in an amount of about 0.5 to 8% of the condensation product and said material is present in an amount of about 2 to 12% of said condensation product.

4. The composition of claim 2 in which said material is an inorganic, water-soluble metal salt oxidizing agent.

5. The composition of claim 2 in which said material consists essentially of sodium persulfate.

6. The composition of claim 2 in which said material consists essentially of acetic acid.

7. The composition of claim 2 in which said material contains small amounts of a water-soluble lower monocarboxylic alkanoic acid and an inorganic, water-soluble metal salt oxidizing agent sufficient to enhance the anti-staining characteristics of said composition.

8. The composition of claim 7 in which said material consists essentially of sodium persulfate and acetic acid.

9. The composition of claim 2 in which said material is about 2 to 12% of a water-soluble, lower monocarboxylic alkanoic acid.

10. A liquid, water self-dispersible composition of matter consisting essentially of a condensate of about 75–90% of a drying oil ester of an unsaturated fatty acid ester of 14–20 carbon atoms and a polyhydric alkanol of 3–6 carbon atoms and having 3–6 hydroxyl groups, and about 10–25% of a polyoxyethylene polyol having a molecular weight of about 400–2000, said polyol having the formula $$R\text{---}[O(C_2H_4O)_nH]_m$$

where R is an $m$-valent hydrocarbon radical of 3–6 carbon atoms, $n$ is 4–12 and $m$ is 3–6; about 0.5 to 15% of a drying oil-soluble heavy metal paint drier carboxylic acid salt of a heavy metal having an atomic number of 20–82, and a carboxylic acid of 5 to 40 carbon atoms; and about 1 to 20% of a material selected from the group consisting of inorganic, water-soluble, metal salt oxidizing agents and water-soluble, lower monocarboxylic alkanoic acids, said material and said drier being present in amounts sufficient to retard surface staining of phenolic containing wood when coated by an aqueous dispersion of said composition, and said composition containing at least a sufficient amount of water to dissolve said material.

11. The composition of claim 10 in which the material consists essentially of sodium persulfate and is present in an amount of about 2 to 12% based on said condensation product.

12. The composition of claim 10 in which the material consists essentially of acetic acid and is present in an amount of about 2 to 12% based on said condensation product.

13. The composition of claim 10 in which the material consists essentially of sodium persulfate and acetic acid, each being present in an amount of about 2 to 12% based on said condensation product.

14. The composition of claim 10 in which the drying oil ester is modified with a polyhydric alkanol of 3–6 carbon atoms and having 3–6 hydroxyl groups and a dicarboxylic acid of 4–8 carbon atoms, said polyhydric alkanol and dicarboxylic acid being about 5 to 20% of the drying oil ester.

15. The composition of claim 13 wherein the dicarboxylic acid is maleic acid and the modifying polyhydric alcohol is pentaerythritol.

16. The composition of claim 15 wherein the drying oil ester is linseed oil.

17. A liquid, water self-dispersible compositon of matter consisting essentially of a condensate of about 75–90% of a drying oil ester of an unsaturated fatty acid ester of 14–20 carbon atoms and a polyhydric alkanol of 3–6 carbon atoms and having 3–6 hydroxyl groups, and about 10–25% of a polyethylene glycol having molecular weight of about 400–2000; about 0.5 to 15% of a drying oil-soluble heavy metal paint drier carboxylic acid salt of a heavy metal having an atomic number of 20–82, and a carboxylic acid of 5 to 40 carbon atoms; and about 1 to 20% of a material selected from the group consisting of inorganic, water-soluble, metal salt oxidizing agents and water-soluble lower monocarboxylic alkanoic acids, said material and said drier being present in amounts sufficient to retard surface staining of phenolic containing wood when coated by an aqueous dispersion of said composition, and said composition containing at least a sufficient amount of water to dissolve said material.

18. The composition of claim 17 in which the material consists essentially of sodium persulfate and acetic acid, each being present in an amount of about 2 to 12% based on said condensation product.

19. A wood base selected from the group consisting of redwood and cedar and having coated thereon the composition of claim 1, said composition having been applied to said wood as an aqueous dispersion.

20. A wood base selected from the group consisting of redwood and cedar and having coated thereon the composition of claim 3, said composition having been applied to said wood as an aqueous dispersion.

21. A wood base selected from the group consisting of redwood and cedar and having coated thereon the composition of claim 4, said composition having been applied to said wood as an aqueous dispersion.

22. A wood base selected from the group consisting of redwood and cedar and having coated thereon the composition of claim 7, said composition having been applied to said wood as an aqueous dispersion.

23. A wood base selected from the group consisting of redwood and cedar and having coated thereon the composition of claim 8, said composition having been applied to said wood as an aqueous dispersion.

24. A wood base selected from the group consisting of redwood and cedar and having coated thereon the composition of claim 9, said composition having been applied to said wood as an aqueous dispersion.

25. A wood base selected from the group consisting of redwood and cedar and having coated thereon the composition of claim 10, said composition having been applied to said wood as an aqueous dispersion.

26. A wood base selected from the group consisting of redwood and cedar and having coated thereon the composition of claim 13, said composition having been applied to said wood as an aqueous dispersion.

27. A wood base selected from the group consisting of redwood and cedar and having coated thereon the composition of claim 14, said composition having been applied to said wood as an aqueous dispersion.

28. A wood base selected from the group consisting of redwood and cedar and having coated thereon the composition of claim 16, said composition having been applied to said wood as an aqueous dispersion.

29. A wood base selected from the group consisting of redwood and cedar and having coated thereon the composition of claim 17, said composition having been applied to said wood as an aqueous dispersion.

30. The composition of claim 1 in which the heavy metal of the drying oil-soluble heavy metal paint drier carboxylic acid salt is selected from the group consisting of lead, manganese and cobalt.

31. The composition of claim 30 in which the heavy metal salt is a naphthenate.

32. The composition of claim 4 in which said material is a peroxy compound of an alkali metal.

33. The composition of claim 32 in which the alkali metal is sodium.

34. The composition of claim 32 in which the heavy metal of the drying oil-soluble heavy metal paint drier carboxylic acid salt is selected from the group consisting of lead, manganese and cobalt.

35. The composition of claim 34 in which the heavy metal salt is a naphthenate.

36. The composition of claim 35 in which said material is sodium persulfate.

37. The composition of claim 1 in which said material is a drying oil-soluble organic peroxide.

38. The composition of claim 37 in which the heavy metal of the drying oil-soluble heavy metal paint drier carboxylic acid salt is selected from the group consisting of lead, manganese and cobalt.

39. The composition of claim 38 in which the heavy metal salt is a naphthenate.

40. The composition of claim 9 in which the heavy metal of the drying oil-soluble heavy metal paint drier carboxylic acid salt is selected from the group consisting of lead, manganese and cobalt.

41. The composition of claim 40 in which the heavy metal salt is a naphthenate.

42. A wood base selected from the group consisting of redwood and cedar and having coated thereon the composition of claim 1 in which the heavy metal of the drying oil-soluble heavy metal paint drier carboxylic acid salt is of a metal selected from the group consisting of lead, manganese and cobalt, said composition having been applied to said wood as an aqueous dispersion.

43. The wood base of claim 42 in which the heavy metal salt is a naphthenate.

44. The wood base of claim 43 in which said material is selected from the group consisting of water-soluble, inorganic peroxy compounds of an alkali metal and water-soluble, lower monocarboxylic alkanoic acids.

45. The wood base of claim 44 in which said material is selected from the group consisting of sodium persulfate and acetic acid.

References Cited

UNITED STATES PATENTS

| | | | |
|---|---|---|---|
| 2,418,451 | 2/1944 | Auer | 106—252 |
| 3,001,961 | 9/1961 | Armitage | 106—252 |
| 3,100,157 | 8/1963 | Schroeder et al. | 106—252 XR |

FOREIGN PATENTS

| | | |
|---|---|---|
| 6,717 | 11/1907 | Great Britain. |

ALEXANDER H. BRODMERKEL, *Primary Examiner.*

JOSEPH REBOLD, MORRIS LIEBMAN, *Examiners.*

J. E. CARSON, J. B. EVANS, *Assistant Examiners.*